(12) United States Patent
Kobayashi

(10) Patent No.: US 7,445,221 B2
(45) Date of Patent: Nov. 4, 2008

(54) STEP APPARATUS

(75) Inventor: Norikazu Kobayashi, Chita (JP)

(73) Assignee: Aisin Seiki Kabushiki Kaisha, Kariya-Shi, Aichi- Ken (JP)

( * ) Notice: Subject to any disclaimer, the term of this patent is extended or adjusted under 35 U.S.C. 154(b) by 154 days.

(21) Appl. No.: 11/337,549

(22) Filed: Jan. 24, 2006

(65) Prior Publication Data
US 2006/0163836 A1 Jul. 27, 2006

(30) Foreign Application Priority Data
Jan. 27, 2005 (JP) .............................. 2005-019298

(51) Int. Cl.
B60R 3/02 (2006.01)
(52) U.S. Cl. ....................... 280/166; 280/163
(58) Field of Classification Search ................. 280/166, 280/163, 164.1
See application file for complete search history.

(56) References Cited

U.S. PATENT DOCUMENTS

| | | | | |
|---|---|---|---|---|
| 4,174,115 A | * | 11/1979 | Youngblood | 280/163 |
| 5,111,912 A | * | 5/1992 | Kempf | 187/250 |
| 5,137,294 A | * | 8/1992 | Martin | 280/166 |
| 5,199,731 A | * | 4/1993 | Martin | 280/166 |
| 5,224,722 A | * | 7/1993 | Kempf | 280/166 |
| 5,224,723 A | * | 7/1993 | Hatas | 280/166 |
| 5,316,432 A | * | 5/1994 | Smalley et al. | 414/540 |
| 5,425,615 A | * | 6/1995 | Hall et al. | 414/545 |
| 6,325,397 B1 | * | 12/2001 | Pascoe et al. | 280/166 |
| 6,375,207 B1 | * | 4/2002 | Dean et al. | 280/166 |
| 6,663,125 B1 | * | 12/2003 | Cheng | 280/166 |
| 6,834,875 B2 | * | 12/2004 | Leitner et al. | 280/166 |
| 6,926,295 B2 | * | 8/2005 | Berkebile et al. | 280/166 |
| 6,942,233 B2 | * | 9/2005 | Leitner et al. | 280/166 |
| 6,955,370 B2 | * | 10/2005 | Fabiano et al. | 280/163 |
| 7,017,927 B2 | * | 3/2006 | Henderson et al. | 280/166 |
| 7,055,839 B2 | * | 6/2006 | Leitner | 280/166 |
| 7,118,120 B2 | * | 10/2006 | Lee et al. | 280/166 |
| 7,163,221 B2 | * | 1/2007 | Leitner | 280/166 |
| 2005/0104318 A1 | * | 5/2005 | Lee et al. | 280/166 |
| 2007/0069497 A1 | * | 3/2007 | Watson | 280/166 |

FOREIGN PATENT DOCUMENTS

| | | |
|---|---|---|
| JP | H04-086551 | 7/1992 |
| JP | H05-063988 | 8/1993 |

* cited by examiner

*Primary Examiner*—Jeffrey J Restifo
(74) *Attorney, Agent, or Firm*—Buchanan Ingersoll & Rooney PC

(57) ABSTRACT

A step apparatus includes a step body that can move between a projecting position where the step body projects from a side surface of the vehicle and a retracted position where the step body is retracted behind the side surface of the vehicle, a drive unit for driving the step body, the drive unit including a rope-shaped member connected to the step body, a rotating drum around which the rope-shaped member is wound, and a drive motor that rotates the rotating drum, and a guide unit for guiding the movement of the step body between the projecting position and the retracted position.

18 Claims, 5 Drawing Sheets

STEP APPARATUS

CROSS REFERENCES TO RELATED APPLICATIONS

This application is based on and claims priority under 35 U.S.C. §119 with respect to Japanese Patent Application No. 2005-019298 filed on Jan. 27, 2005, the entire contents of which is incorporated herein by reference.

BACKGROUND OF THE INVENTION

1. Field of the Invention

The present invention relates to a step apparatus including a step body that can move between a projecting position where the step body projects from a side surface of a vehicle and a retracted position where the step body is retracted behind the side surface of the vehicle and a drive unit that drives the step body.

2. Description of the Related Art

In such a step apparatus, when an occupant tries to get into or out of the vehicle, the drive unit drives the step body to the projecting position so that the step body projects outward and assists the occupant in getting into or out of the vehicle.

When the vehicle drives, the drive unit drives the step body to the retracted position so that the step body does not protrude from the side surface of the vehicle and is prevented from being damaged.

Japanese Unexamined Utility Model Registration Application Publication No. 4-86551 discloses an example of a step apparatus in which a drive unit includes a drive motor and a parallel link mechanism that connects the drive motor to a step body. The parallel link mechanism has a plurality of link members connected to each other such that the link members can rotate around vertical axes.

In this step apparatus, the step body is moved horizontally between the projecting position and the retracted position.

Japanese Unexamined Utility Model Registration Application Publication No. 5-63988 discloses another example of a step apparatus in which a drive unit includes a drive motor that rotates a rotating shaft around an axial center extending along the length of a step body and a gear-rotating mechanism that connects the rotational axis to the step body. The gear-rotating mechanism has a plurality of rotating members that rotate around the axial center extending along the length of the step body.

In this step apparatus, the step body is rotated around the axial center extending along the length of the stop body between the projecting position and the retracted position.

In the step apparatus disclosed in Japanese Unexamined Utility Model Registration Application Publication No. 4-86551, a space for installing the link members included in the parallel link mechanism and a space for allowing the link members to move must be provided in addition to a space for installing the drive motor. Accordingly, the installation space for the drive unit is large.

In addition, the drive unit must be installed at a position where a space without obstacles covers the moving areas of the link members. Thus, the installation position of the drive unit is limited.

In the step apparatus disclosed in Japanese Unexamined Utility Model Registration Application Publication No. 5-63988, a space for installing the rotating shaft that extends along the length of the step body must be provided in addition to a space for installing the drive motor. Accordingly, the installation space for the drive unit is large.

In addition, the drive unit must be installed at a position where a space without obstacles covers the entire length of the step body so that the rotating shaft can be placed. Thus, the installation position of the drive unit is limited.

SUMMARY OF THE INVENTION

In light of the above-described situation, an object of the present invention is to provide a step apparatus including a drive unit that can be installed in a small space and that can reduce the limit to the installation position thereof.

To achieve this object, according to an aspect of the present invention, a step apparatus includes a step body that can move between a projecting position where the step body projects from a side surface of the vehicle and a retracted position where the step body is retracted behind the side surface of the vehicle, a drive unit for driving the step body, the drive unit including a rope-shaped member connected to the step body, a rotating drum around which the rope-shaped member is wound, and a drive motor that rotates the rotating drum, and a guide unit for guiding the movement of the step body between the projecting position and the retracted position.

When the drive motor rotates the rotating drum, the rope-shaped member moves along the length thereof, thereby moving the step body. At this time, the guide unit guides the movement of the step body such that the step body moves from the retracted position to the projecting position or from the projecting position to the retracted position.

Thus, the drive unit drives the step body between the projecting position and the retracted position.

When the drive unit is installed, even when the rotating drum and the step body are disposed separately from each other, the rope-shaped member wound around the rotating drum can be positioned such that the rope-shaped member is connected to the step body.

The rope-shaped member itself requires a small installation space, and the longitudinal direction of the rope-shaped member can be freely changed when the rope-shaped member is installed. Therefore, even if there is an obstacle between the rotating drum and the step body, the rope-shaped member may be disposed so as to avoid the obstacle.

Accordingly, although the drive unit requires installation spaces for the drive motor and the rotating drum, the installation space for the rope-shaped member is small. In addition, the rotating drum and the step body may be installed at separate positions and the drive unit may be installed at a position where there is an obstacle between the rotating drum and the step body.

Thus, a step apparatus including a drive unit that can be installed in a small space and that can reduce the limit to the installation position thereof is provided.

According to the present invention, the step apparatus may further include a connecting unit for connecting the rope-shaped member to the step body and moving the step body in association with the movement of the rope-shaped member along the length of the rope-shaped member.

When the rope-shaped member moves along the length thereof, the connecting unit moves the step body while adequately associating the movement of the rope-shaped member with the movement of the step body.

Even when the longitudinal direction of the rope-shaped member differs from the moving direction of the step body, the connecting unit connects the rope-shaped member to the step body such that the movement of the rope-shaped member along the length thereof can be converted into the movement of the step body in the moving direction thereof.

When the above-described connecting unit is provided, the step body can be adequately moved by driving the rope-shaped member.

In the step apparatus according to the present invention, the connecting unit may include an arm that projects from the step body and extends along a moving direction of the step body. In this case, one longitudinal end of the rope-shaped member is restrained at a distal end of the arm and the other longitudinal end of the rope-shaped member is restrained at a proximal end of the arm or at the step body, portions of the rope-shaped member near the longitudinal ends of the rope-shaped member extending along the extending direction of the arm.

When the rope-shaped member moves in one direction along the length thereof, the distal end of the arm is pulled so that the arm is moved in a moving direction of the step body. When the rope-shaped member moves in the opposite direction along the length thereof, the proximal end of the arm or the step body is pulled so that the arm is moved in the opposite moving direction.

Since the arm can be moved along the moving direction of the step body in association with the movement of the rope-shaped member along the length thereof, the step body can be adequately moved along the moving direction thereof.

In addition, since the portions of the rope-shaped member near the longitudinal ends thereof extend along the extending direction of the arm, that is, along the moving direction of the step body, the rope-shaped member can be driven in accordance with the moving direction of the step body and the arm can be easily moved along the moving direction of the step body.

In the step apparatus according to the present invention, a plurality of the connecting units may be arranged along the length of the step body with intervals therebetween.

If the step body is moved with a single connecting unit, only a portion of the step body is pulled to move the entire body thereof. Accordingly, when the step body is long, the step body is easily distorted.

When a plurality of connecting units are provided as described above, the step body can be evenly moved over the length thereof. Therefore, distortion and the like of the step body can be prevented and the step body can be adequately moved.

In the step apparatus according to the present invention, the drive unit may include a plurality of the rope-shaped members that correspond to the plurality of connecting units, the rotating drum around which the rope-shaped members are wound, and the drive motor that rotates the rotating drum. In this case, the plurality of connecting units are configured to operate in association with the movements of the corresponding rope-shaped members.

When a single drive motor rotates the rotating drum, a plurality of rope-shaped members move along the length thereof and the connecting units move the step body in association with the movements of the corresponding rope-shaped members.

Thus, although a plurality of connecting units are provided to evenly move the step body over the length thereof, the drive unit requires only one drive motor. Therefore, the cost can be reduced.

In the step apparatus according to the present invention, the projecting position and the retracted position between which the guide unit guides the movement of the step body may be at different heights.

Accordingly, even when the height of the optimum projecting position for assisting an occupant in getting into or out of the vehicle and the height of the optimum retracted position for installing the step body differ from each other, the step body can be moved between the optimum positions.

The guide unit may, for example, move the step body between the projecting position and the retracted position that is higher than the projecting position. If the retracted position is higher than the projecting position, the step body can be retracted to a position higher than the bottom edge of the side surface of the vehicle.

In this case, when the step body is at the retracted position, the step body does not protrude from the bottom edge of the side surface of the vehicle and is reliably prevented from being damaged.

In addition, if the retracted position is higher than the projecting position, the step body moves downward to the projecting position. Therefore, the distance between the step body at the projecting position and the ground can be reduced. Accordingly, the occupant can easily get into or out of the vehicle.

In the step apparatus according to the present invention, the guide unit may include a plurality of guiding portions that are substantially parallel to each other and a sliding member that is connected to the step body and that slides along the guiding portions.

When the step body moves, the sliding member slides along the guiding portions so as to guide the movement of the step body. Since the sliding member slides along a plurality of guiding portions that are substantially parallel to each other instead of sliding along a single guiding portion, the sliding member can move smoothly.

Accordingly, the guiding unit that smoothly guide the movement of the step body has a simple structure including the guiding portions and the sliding member.

In the step apparatus according to the present invention, a plurality of the guide units may be arranged along the length of the step body with intervals therebetween.

In this case, since the step body is guided by a plurality of guide units, the step body can be evenly guided over the length thereof. Accordingly, the movement of the step body can be smoothly and evenly guided.

DESCRIPTION OF THE PREFERRED EMBODIMENTS

A step apparatus according to an embodiment of the present invention will be described below with reference to the accompanying drawings.

Figure 1:
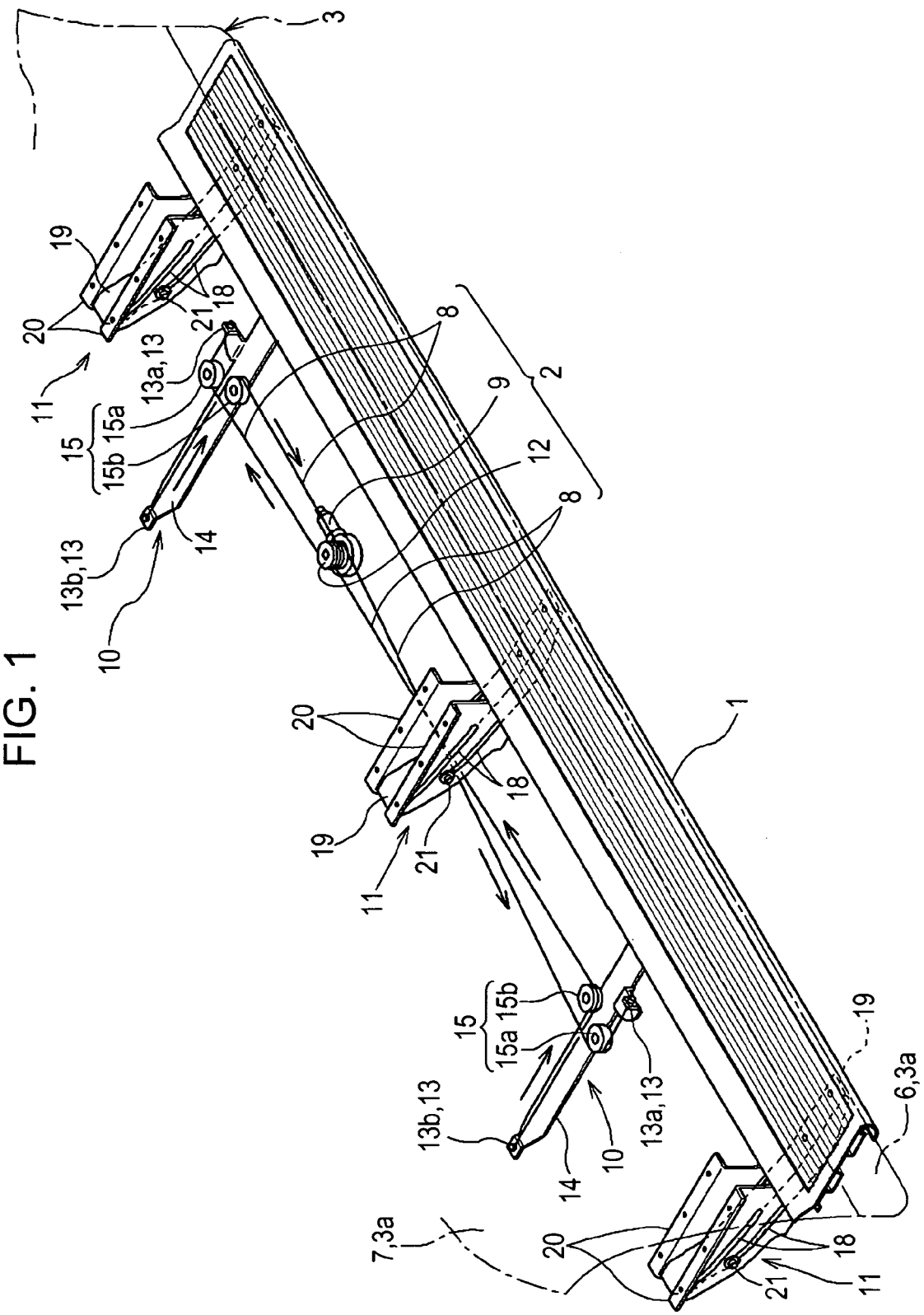
FIG. 1 is a perspective view illustrating the state in which a step body is at a retracted position.
Figure 2:
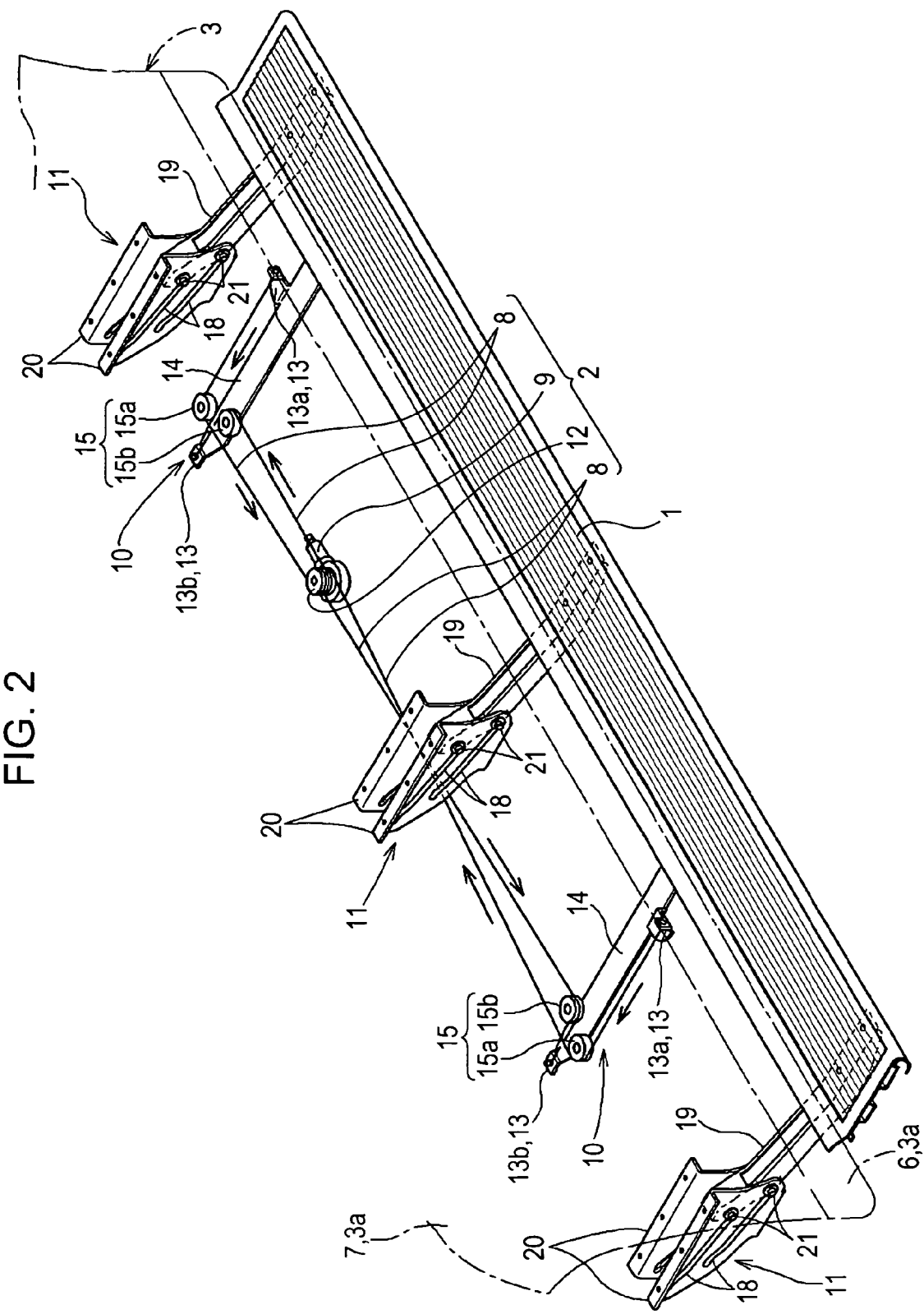
FIG. 2 is a perspective view illustrating the state in which the step body is at a projecting position.

Referring to FIGS. 1 and 2, the step apparatus includes a step body 1 that can move between a projecting position and a retracted position and a drive unit 2 that drives the step body 1.

FIG. 1 is a perspective view of the step apparatus in the state in which the step body 1 is at the retracted position and FIG. 2 is a perspective view of the step apparatus in the state in which the step body 1 is at the projecting position.

Figure 3:
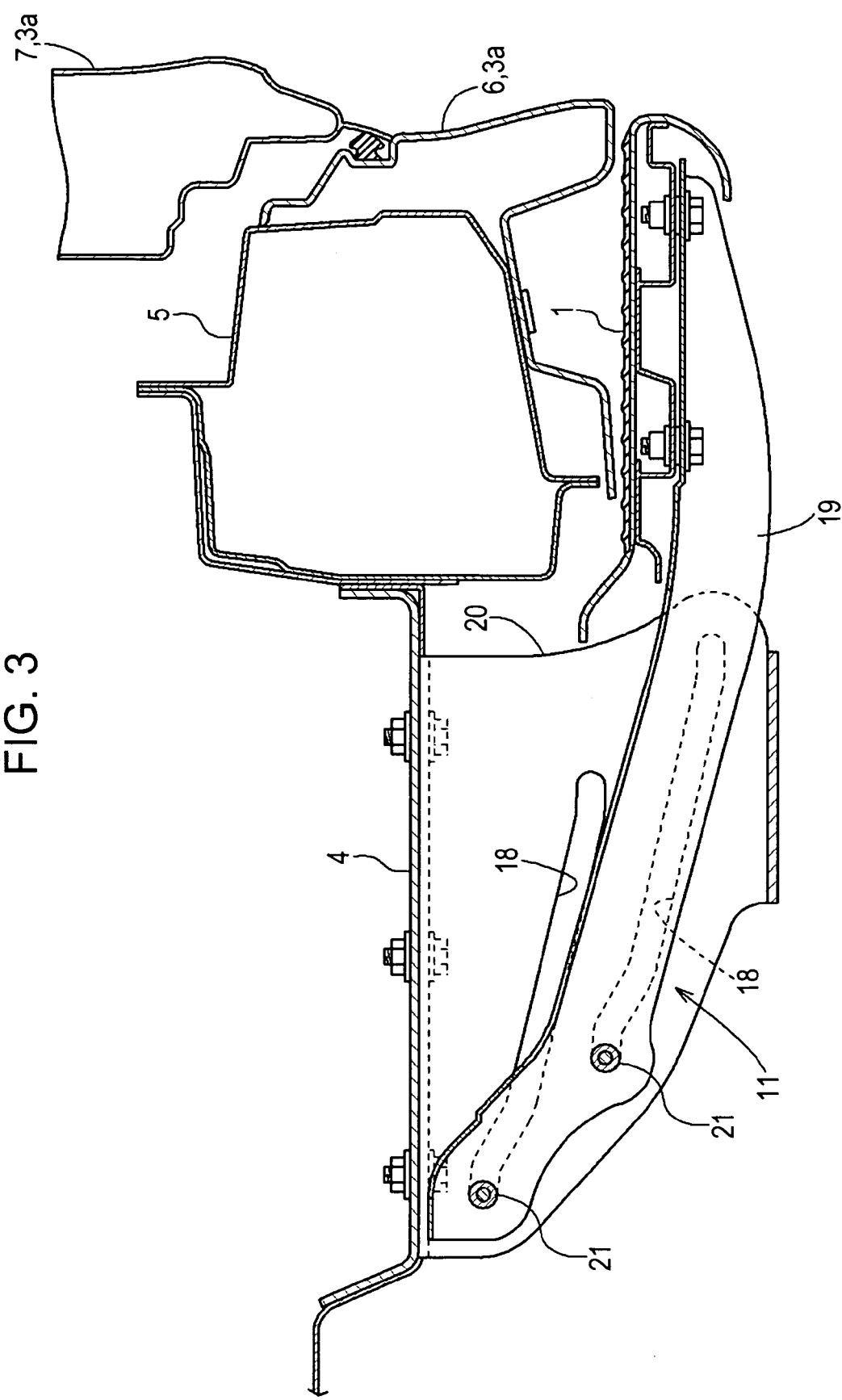
FIG. 3 is a vertical sectional view illustrating the state in which the step body is at the retracted position.
Figure 4:
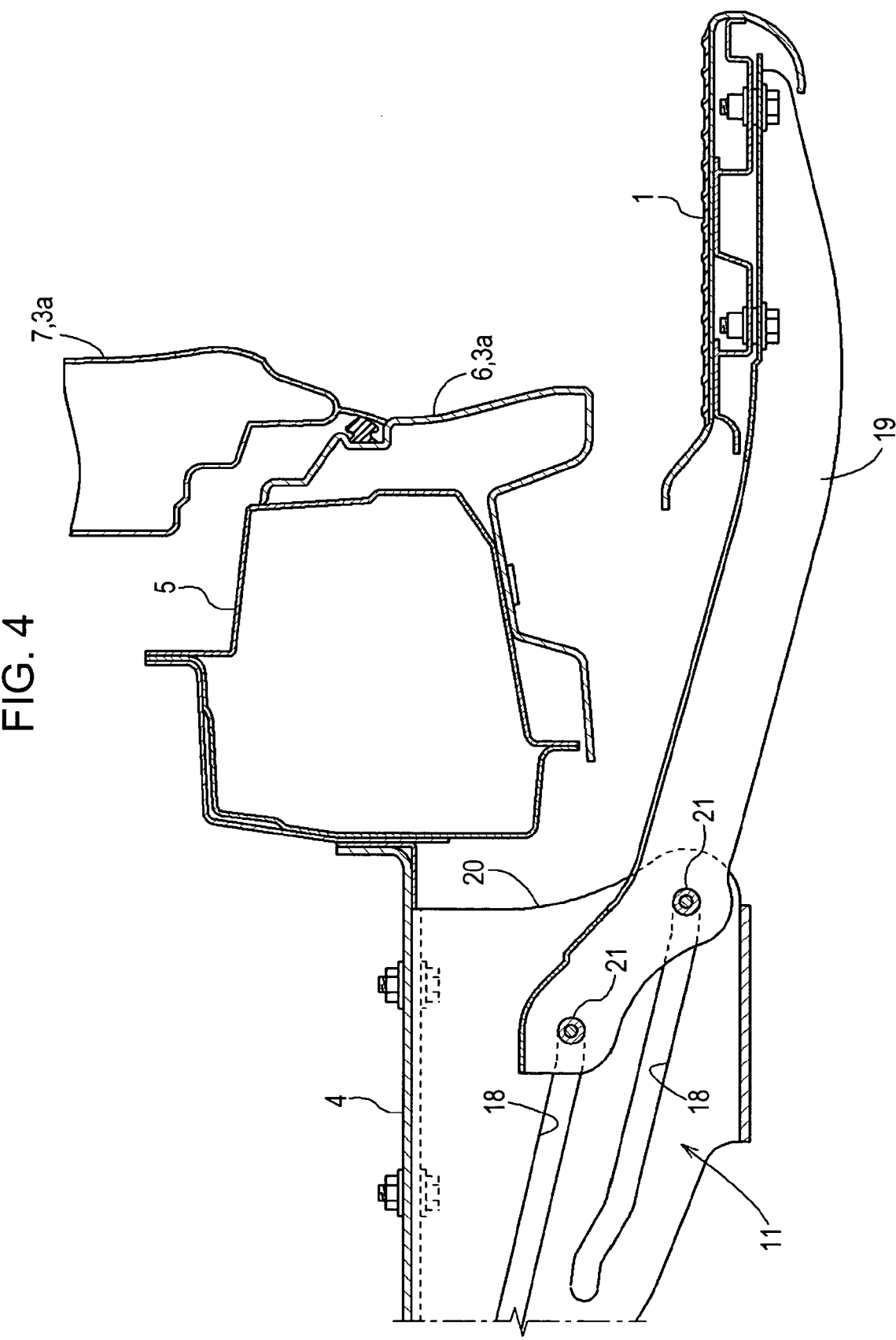
FIG. 4 is a vertical sectional view illustrating the state in which the step body is at the projecting position.

The step body 1 extends along the front-rear direction of a vehicle 3. As shown in FIG. 3, which is a vertical sectional view taken along a plane perpendicular to the front-rear direction of the vehicle 3, the retracted position is a position where the step body 1 is retracted behind a side surface 3a of the vehicle 3. In addition, as shown in FIG. 4, which is also a vertical sectional view taken along a plane perpendicular to the front-rear direction of the vehicle 3, the projecting position is a position where the step body 1 projects from the side surface 3a of the vehicle 3.

The vehicle 3 includes a bottom plate 4, a reinforcing member 5 positioned outside the bottom plate and extending along the front-rear direction of the vehicle, and a panel member 6 that covers the periphery of the reinforcing member 5.

The panel member 6 and a door panel 7 positioned above the panel member 6 form the side surface 3a of the vehicle 3.

As shown in FIGS. 1 and 2, the drive unit 2 includes wires 8, which function as rope-shaped members, a rotating drum 12 around which the wires 8 are wound, and a drive motor 9 that rotates the rotating drum 12.

Connecting units 10 are provided to connect the wires 8 to the step body 1 and move the step body 1 in association with the movement of the wires 8 along the length thereof. In addition, guide units 11 are provided to guide the step body 1 between the projecting position and the retracted position.

Three guide units 11 in total are arranged at the longitudinal ends and the center of the step body 1 with intervals therebetween along the length thereof. In addition, two connecting units 10 in total are arranged along the length of the step body 1 with an interval therebetween, each connecting unit 10 being positioned between the adjacent guide units 11.

Figure 5:
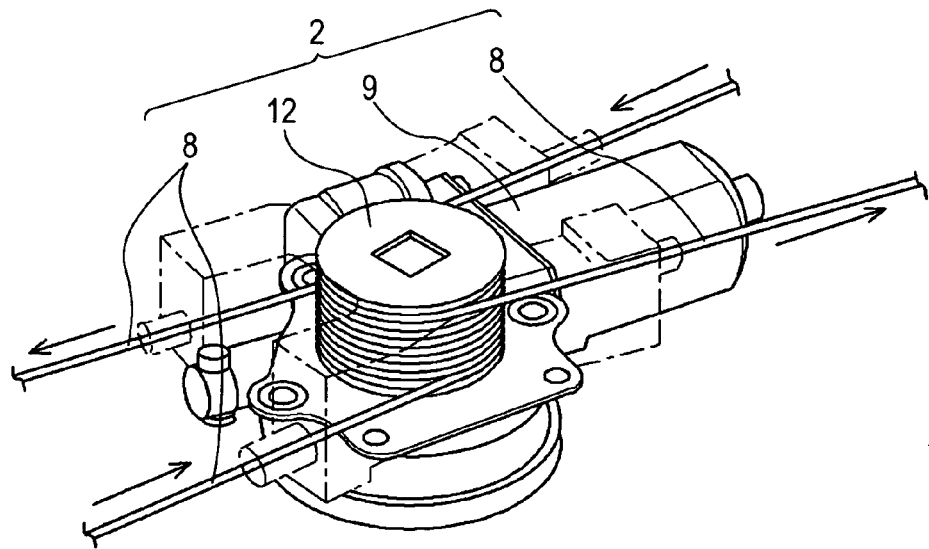
FIG. 5 is a perspective view of a drive motor.

As shown in FIG. 5, the drive motor 9 rotates the rotating drum 12 around which the wires 8 are wound in a forward or reverse direction, and thereby drives the wires 8 along the length thereof. Although not shown in the figure, the drive motor 9 is attached to the bottom plate 4 of the vehicle 3 with a bracket or the like.

Two wires 8 are respectively wound around an upper section and a lower section of the rotating drum 12. Accordingly, a single drive motor 9 drives two wires 8 by rotating the rotating drum 12.

As shown in FIGS. 1 and 2, the two connecting units 10 are configured to operate in association with the movement of the respective wires 8. In the present embodiment, each connecting unit 10 corresponds to one wire 8.

Each of the two connecting units 10 has an arm 14 that extends along the moving direction of the step body 1 that is perpendicular to the length of the step body 1. In addition, retaining members 13 are provided near the ends of the arm 14 to retain the wire 8 at the longitudinal ends thereof.

The connecting units 10 move the arms 14 in the moving direction of the step body 1 in association with the movement of the respective wires 8, thereby moving the step body 1 in the moving direction thereof.

The retaining members 13 provided on each arm 14 include a first retaining member 13a and a second retaining member 13b. The first retaining member 13a is positioned near a proximal end of the arm 14 that is adjacent to the step body 1 and retains one end of the corresponding wire 8. The second retaining member 13b is positioned near a distal end of the arm 14 that is distant from the step body 1 and retains the other end of the corresponding wire 8.

In addition, each arm 14 is provided with rotating members 15 that rotate around vertical axial centers thereof, the rotating members 15 supporting the wire 8 extending from the rotating drum 12 and restraining the wire 8 with respect to the retaining members 13. The rotating members 15 include a first rotating member 15a corresponding to the first retaining member 13a and a second rotating member 15b corresponding to the second retaining member 13b.

Accordingly, portions of the rope-shaped member 8 near the longitudinal ends thereof extend along the extending direction of the arm 14.

Figure 6:
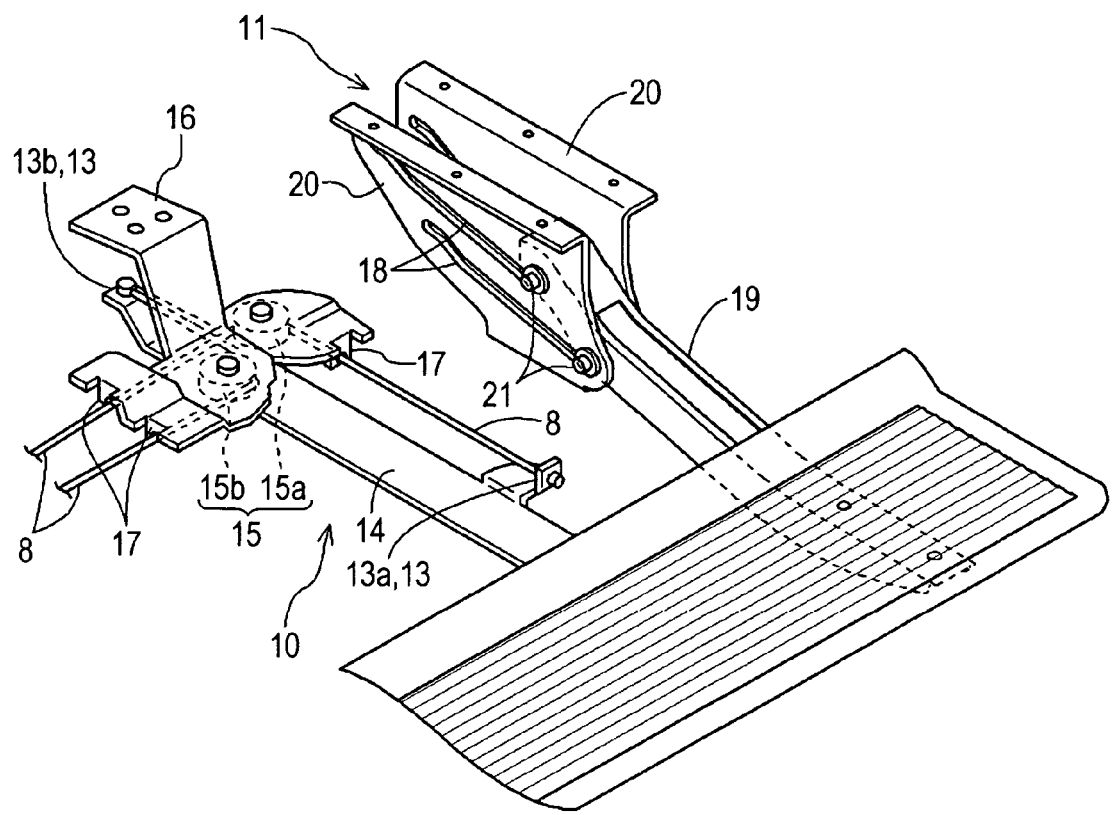
FIG. 6 is an enlarged perspective view of a part of the step apparatus.

As shown in FIG. 6, the first rotating member 15a and the second rotating member 15b are retained by a bracket 16 fixed to the bottom plate 4 of the vehicle 3.

In addition, a plurality of notch-shaped wire-restraining portions 17 are provided to retain the wire 8 extending from the rotating drum 12 and restrain the wires 8 with respect to the rotating members 15.

The three guide units 11 are configured to guide the movement of the step body 1 between the retracted position and the projecting position that are at different heights.

In the present embodiment, the retracted position shown in FIG. 3 is higher than the projecting position shown in FIG. 4, and the guide units 11 guide the movement of the step body 1 between the retracted position and the projecting position.

As shown in FIG. 6, each of the three guide units 11 has two guiding portions 18 that are substantially parallel to each other and a sliding member 19 that is connected to the step body 1 and slides along the guiding portions 18.

The two guiding portions 18 are long holes formed in each of a pair of brackets 20 fixed to the bottom plate 4 of the vehicle 3.

The sliding member 19 has sliding pins 21 extending outward through the long holes that function as the guiding portions 18 and is disposed between the brackets 20. In addition, as shown in FIGS. 3 and 4, the sliding member 19 is fixed to the step body 1 with bolts and nuts at one end thereof such that the sliding member 19 receives and supports the body 1.

Thus, the step body 1 is received and supported by the sliding members 19, and accordingly the sliding members 19 receive the load applied to the step body 1. Since the sliding members 19 are arranged at the longitudinal ends and the center of the step body 1, the load applied to the step body 1 can be supported with a good balance.

As shown in FIGS. 3 and 4, each guiding portion 18 is inclined such that the inner end thereof is positioned higher than the outer end thereof along the width of the vehicle 3.

Accordingly, when the sliding members 19 slide along the guiding portions 18, the step body 1 moves between the projecting position and the retracted position that is higher than the projecting position.

In FIGS. 1 and 2, the wires 8 are arranged linearly between the drive motor 9 and the connecting units 10 since the spaces between the drive motor 9 and the connecting units 10 have no obstacles.

When, for example, there are obstacles between the drive motor 9 and the connecting units 10, the wires 8 may be bent so as to avoid the obstacles by adequately arranging the rotating members and the wire-restraining portions. Accordingly, the drive unit 2 can be installed even when there are obstacles between the drive motor 9 and the connecting units 10.

Thus, the drive unit 2 can be installed in a small space since the wires 8 are used and the limit to the installation position of the drive unit 2 can be reduced.

The operation of the step apparatus will be explained below.

When the vehicle drives, the step body 1 is moved to the retracted position, as shown in FIGS. 1 and 3. When an occupant gets into or out of the vehicle, the step body 1 is moved to the projecting position, as shown in FIGS. 2 and 4.

When the step body 1 is at the retracted position as shown in FIGS. 1 and 3, the drive motor 9 rotates the rotating drum 12 such that the wires 8 move in the directions shown by the arrows in FIG. 1.

Accordingly, the arms 14 move outward along the width of the vehicle 3 in association with the movement of the wires 8, thereby moving the step body 1 outward along the width of the vehicle 3. At this time, the sliding members 19 slide along the guiding portions 18 to guide the movement of the step body 1.

Then, when the sliding members 19 reach the ends of the guiding portions 18, the step body 1 reaches the projecting position as shown in FIGS. 2 and 4.

When the step body 1 is at the projecting position, the drive motor 9 rotates the rotating drum 12 in the opposite direction so that the wires 8 move in the directions shown by the arrows in FIG. 2. Accordingly, the step body 1 moves from the projecting position to the retracted position.

Other Embodiments (1) In the above-described embodiment, each of the connecting units 10 includes the arm 14 that extends along the moving direction of the step body 1 and the retaining members 13 are disposed near the proximal and distal ends of the arm 14. However, instead of providing the retaining member 13a near the proximal end of the arm 14, a retaining member 13 may also be provided directly on the step body 1. Thus, the positions of the retaining members 13 may be changed.

In addition, the shape of the arm 14 included in each connecting unit 10 and the positions at which the longitudinal ends of the wires 8 are restrained are not limited and the structure of each connecting unit 10 may be modified as necessary.

(2) In the above-described embodiment, portions of each wire 8 near the longitudinal ends thereof extend along the extending direction of the arm 14. However, directions in which the wires 8 extend may be changed as necessary.

(3) In the above-described embodiment, the guide units 11 guide the movement of the step body 1 between the projecting position and the retracted position that is higher than the projecting position. However, the guide units 11 may also guide the movement of the step body 1 between the projecting position and the retracted position that is lower than the projecting position. Alternatively, the guide units 11 may also guide the movement of the step body 1 between the projecting position and the retracted position that are at the same height.

The relationship between the heights of the projecting position and the retracted position can be changed by changing the shapes of the guiding portions 18.

(4) In the above-described embodiment, two guiding portions 18 are arranged substantially parallel to each other. However, the number of guiding portions 18 may also be changed to one or three or more as necessary.

In addition, in the above-describe embodiment, each of a plurality of guide units 11 has two guiding portions. However, the guide units 11 may also have different numbers of guiding portions 18.

(5) In the above-described embodiment, three guide units 11 in total are provided at the longitudinal ends and the center of the step body 1 with intervals therebetween along the length thereof. However, the positions and number of the guide units 11 may be changed as necessary.

(6) In the above-described embodiment, two connecting units 10 in total are arranged along the length of the step body 1 with an interval therebetween, each connecting unit 10 being positioned between the adjacent guide units 11. However, the positions and number of the connecting units 10 may be changed as necessary.

(7) In the above-described embodiment, two wires 8 are driven by a single drive motor 9. However, the number of wires 8 driven by a single drive motor 9 may be changed as necessary. For example, one wire 8 may be driven by a single drive motor 9.

(8) In the above-described embodiment, the sliding members 19 have the sliding pins 21 that extend through the long holes that function as the guiding portions 18 so that the sliding members 19 can slide along the guiding portions 18. However, the guiding portions 18 may also be guide rails and the sliding members 19 may be provided with guide rollers that roll along the guide rails so that the sliding members 19 can slide along the guiding portions 18. Thus, the manner in which the sliding members 19 slide along the guiding portions 18 may be changed as necessary.

(9) In the above-described embodiment, the wires 8 are described as an example of rope-shaped members. However, other types of rope-shaped members, such as belts, may also be used.

(10) In the above-described embodiment, the retracted position is a position where the step body is retracted behind the side surface 3a of the vehicle 3 and the projecting position is a position where the step body projects from the side surface 3a of the vehicle 3. However, the retracted position may also be a position where the step body is retracted behind the rear surface of the vehicle and the projecting position may also be a position where the step body projects from the rear surface of the vehicle 3.

The present invention is applicable to various types of step apparatuses having a drive unit for driving a step body between a projecting position where the step body projects from a side surface of a vehicle and a retracted position where the step body is retracted behind the side surface of the vehicle.

What is claimed is:

1. A step apparatus comprising:
    a step body that can move between a projecting position where the step body projects from a side surface of the vehicle and a retracted position where the step body is retracted behind the side surface of the vehicle;
    drive means for driving the step body, the drive means including a rope-shaped member connected to the step body, a rotating drum around which the rope-shaped member is wound, and a drive motor that rotates the rotating drum;
    guide means for guiding the movement of the step body between the projecting position and the retracted position; and
    connecting means for connecting the rope-shaped member to the step body and moving the step body in association with the movement of the rope-shaped member along the length of the rope-shaped member, each of the connecting means including an arm that projects from the step body and extends along a moving direction of the step body, and
    wherein one longitudinal end of the rope-shaped member is restrained at a distal end of the arm and the other longitudinal end of the rope-shaped member is restrained at a proximal end of the arm or at the step body, portions of the rope-shaped member near the longitudinal ends of the rope-shaped member extending along the extending direction of the arm.

2. The step apparatus according to claim 1, wherein a plurality of the connecting means are arranged along the length of the step body with intervals therebetween.

3. The step apparatus according to claim 2, wherein the drive means includes a plurality of the rope-shaped members that correspond to the plurality of connecting means, the rotating drum around which the rope-shaped members are wound, and the drive motor that rotates the rotating drum, and wherein the plurality of connecting means are configured to operate in association with the movements of the corresponding rope-shaped members.

4. The step apparatus according to claim 3, wherein the projecting position and the retracted position between which the guide means guides the movement of the step body are at different heights.

5. The step apparatus according to claim 2, wherein the projecting position and the retracted position between which the guide means guides the movement of the step body are at different heights.

6. The step apparatus according to claim 2, wherein the guide means includes a plurality of guiding portions that are substantially parallel to each other and a sliding member that is connected to the step body and that slides along the guiding portions.

7. The step apparatus according to claim 2, wherein a plurality of the guide means are arranged along the length of the step body with intervals therebetween.

8. The step apparatus according to claim 1, wherein the projecting position and the retracted position between which the guide means guides the movement of the step body are at different heights.

9. The step apparatus according to claim 1, wherein the guide means includes a plurality of guiding portions that are substantially parallel to each other and a sliding member that is connected to the step body and that slides along the guiding portions.

10. The step apparatus according to claim 1, wherein a plurality of the guide means are arranged along the length of the step body with intervals therebetween.

11. A step apparatus comprising:
a step body that can move between a projecting position where the step body projects from a side surface of the vehicle and a retracted position where the step body is retracted behind the side surface of the vehicle;
drive means for driving the step body, the drive means including a rope-shaped member connected to the step body, a rotating drum around which the rope-shaped member is wound, and a drive motor that rotates the rotating drum;
guide means for guiding the movement of the step body between the projecting position and the retracted position; and
a plurality of connecting means for connecting the rope-shaped member to the step body and moving the step body in association with the movement of the rope-shaped member along the length of the rope-shape member, the connecting means including an arm that projects from the step body and extends along a moving direction of the step body, and wherein one longitudinal end of the rope-shape member is restrained at a distal end of the arm and the other longitudinal end of the rope-shaped member is restrained at a proximal end of the arm or at the step body, portions of the rope-shaped member near the longitudinal ends of the rope-shape member extending along the extending direction of the arm.

12. The step apparatus according to claim 11, wherein the drive means includes a plurality of the rope-shaped members that correspond to the plurality of connecting means, the rotating drum around which the rope-shaped members are wound, and the drive motor that rotates the rotating drum, and wherein the plurality of connecting means are configured to operate in association with the movements of the corresponding rope-shaped members.

13. The step apparatus according to claim 12, wherein the projecting position and the retracted position between which the guide means guides the movement of the step body are at different heights.

14. The step apparatus according to claim 12, wherein the guide means includes a plurality of guiding portions that are substantially parallel to each other and a sliding member that is connected to the step body and that slides along the guiding portions.

15. The step apparatus according to claim 12, wherein a plurality of the guide means are arranged along the length of the step body with intervals therebetween.

16. The step apparatus according to claim 11, wherein the projecting position and the retracted position between which the guide means guides the movement of the step body are at different heights.

17. The step apparatus according to claim 11, wherein the guide means includes a plurality of guiding portions that are substantially parallel to each other and a sliding member that is connected to the step body and that slides along the guiding portions.

18. The step apparatus according to claim 11, wherein a plurality of the guide means are arranged along the length of the step body with intervals therebetween.

* * * * *